(12) United States Patent
Kleitman

(10) Patent No.: US 10,117,457 B1
(45) Date of Patent: Nov. 6, 2018

(54) REMOVABLE FILTER FOR A SMOKING PIPE

(71) Applicant: Joseph S. Kleitman, Los Altos Hills, CA (US)

(72) Inventor: Joseph S. Kleitman, Los Altos Hills, CA (US)

(73) Assignee: Joseph S. Kleitman, Los Altos Hills, CA (US)

( * ) Notice: Subject to any disclaimer, the term of this patent is extended or adjusted under 35 U.S.C. 154(b) by 0 days.

(21) Appl. No.: 15/787,602

(22) Filed: Oct. 18, 2017

(51) Int. Cl.
*A24F 1/16* (2006.01)
*A24F 5/08* (2006.01)
*B01D 29/01* (2006.01)

(52) U.S. Cl.
CPC ............... *A24F 5/08* (2013.01); *B01D 29/01* (2013.01)

(58) Field of Classification Search
CPC .......... A24F 1/00; A24F 2700/04; A24F 1/20; A24F 1/10; A24F 1/22; A24F 13/04
USPC ............ 131/209, 339, 201, 203, 207, 198.1, 131/198.2
See application file for complete search history.

(56) References Cited

U.S. PATENT DOCUMENTS

| | | | |
|---|---|---|---|
| 1,628,059 A | 5/1927 | O'Toole | |
| 1,629,059 A * | 5/1927 | Witkovski | B60R 17/00 277/543 |
| 4,340,071 A * | 7/1982 | Smith | A24F 1/22 131/202 |
| 4,549,558 A * | 10/1985 | Gregory | A24F 7/04 131/202 |
| 4,677,992 A * | 7/1987 | Bliznak | A24F 1/20 131/209 |
| 4,732,167 A * | 3/1988 | Nagano | A24F 13/04 131/178 |
| 8,517,032 B2 * | 8/2013 | Urtsev | A24F 47/002 131/271 |
| 8,851,083 B2 * | 10/2014 | Oglesby | A61M 11/047 131/271 |
| 9,380,812 B2 * | 7/2016 | Chung | A24F 47/008 |

FOREIGN PATENT DOCUMENTS

DE 20201600663 U1 1/2017

* cited by examiner

*Primary Examiner* — Phuong Chi T Nguyen
(74) *Attorney, Agent, or Firm* — Kim Rubin

(57) ABSTRACT

A device to be placed in the bowl of a pipe that permits smoke to pass while blocking the material of a burning charge is described. The device includes a screen with a U-shaped staple passing through two holes in the center of the screen. The two points of the staple may be temporarily compressed to pass through the screen, then the points spread so as to make a friction connection with the insides of the bowl, which removably secures the screen in place. The device is free of other holding structures, such as straps. The device is adapted so that a thumb and forefinger may easily grasp the top of the staple for insertion and removal in a bowl. In an embodiment the points of the staple are adapted to push through the screen, creating the holes. An embodiment is adapted to be used in a drainpipe.

18 Claims, 3 Drawing Sheets

REMOVABLE FILTER FOR A SMOKING PIPE

BACKGROUND OF THE INVENTION

Filters in smoking pipes keep the material being burned in the bowl of the pipe from passing into the smoke stream. Such filters are typically screens, that are either semi-permanently installed in the pipe bowl, or they are loose screens. Screens become clogged with material, resin, or other detritus from the material being burned. For the former screens, they are difficult to remove and replace. For the latter screens, they tend to fall out. Prior art includes U.S. Pat. No. 5,744,048A, U.S. Pat. No. 1,629,059, and DE202016006663.

SUMMARY OF THE INVENTION

Embodiments of this invention overcome the problems in the prior art.

Applications specifically include placement in a device for the passing of fluid from a larger diameter into a smaller diameter containing volume, wherein easy placement, removal and replacement of a filter is desired.

A simple embodiment comprises a circular screen with two holes located near the center. The two pins of inverted U-shaped staple pass through the holes. The pins of staple are springy. The staple pins are easily compressed towards each other so that the spacing of the tips of the pins then matches the spacing of the two holes in the screen; the staple may then be easily placed through the two holes. The staple pins then relax to a wider width, retaining the staple in the screen.

The assembly, comprising the screen with the staple passing through it, is then inserted into a smoking pipe bowl. The bottom of the bowl contains an orifice with a narrower internal diameter than the inside of the bowl. The tips of the staple, in their relaxed spacing, are spaced wider than the orifice. As the assembly is pressed into the bowl the perimeter of the screen makes contact with an inside surface of the bowl, while the tips of the staple are compressed together to make a friction contact with the inside of the orifice. In this way, the assembly is held in place primarily by or exclusively by the friction of the staple pin tips against the orifice wall.

Following the placement of the assembly into a pipe bowl, the material to be smoked is placed in the bowl above the screen. When burning, smoke passes from the burning material, through the screen, into the orifice. Solid material larger than a particular particle size, which depends on the fineness of the screen holes, are blocked by the screen and do not enter the smoke stream.

The assembly is easily removed by pulling upward on the curved upper portion of the staple, which projects above the screen. Friction of staple tips in the orifice prevents the assembly from falling out of the bowl.

Another embodiment uses a curved screen, rather than a flat screen. The shape of the screen may approximate a circular pyramid, or a portion of sphere, or another non-flat shape that easily holds material to be burned.

Yet another embodiment comprises a radial slit in the screen extending from the perimeter towards the center of the screen. In this embodiment, the two screen edges of the slit overlap as the screen is placed into a bowl. This allows the screen to be placed into a bowl whose inner diameter is less than the diameter of the pre-placed screen. Such an embodiment permits use in a range of bowl sizes. In addition, the overlap of the screen edges also forms a generally flat screen into a circular pyramid shape.

Yet other embodiments are used in water drainpipes or in chemical pipes. A fluid, such as a liquid or slurry, may pass through the screen.

Benefits of embodiments include lower cost, ease of use, no tools required, and simplicity of use. Other benefits include use with a wide range of existing pipes; no special pipes required, such as pipes with bowls comprising an interior lip on which the filter rests, no tether, and no elements, such as straps over the top of the bowl required to hold the filter in place.

DETAILED DESCRIPTION OF THE INVENTION

Descriptions, embodiments and drawings are non-limiting.

Figure 1:
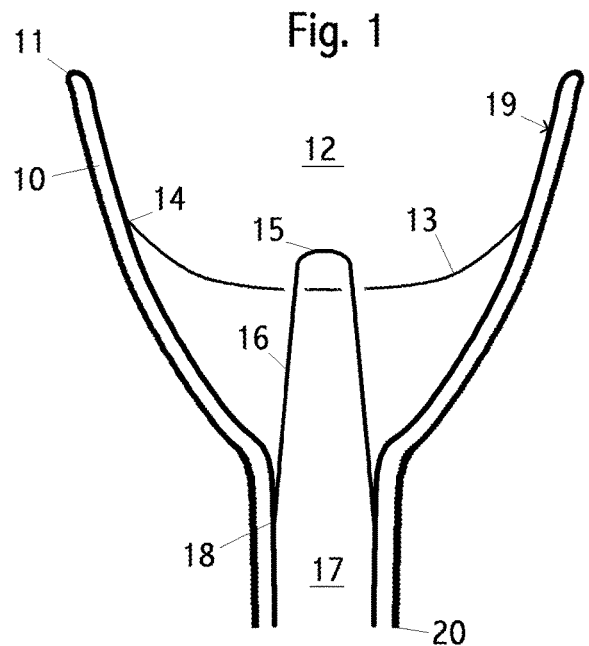
FIG. 1 shows a side view cross section of an assembly placed in a smoking pipe bowl.

FIG. 1 shows an embodiment placed in smoking pipe bowl, in a cut-away cross-section. The pipe bowl is 10. The upper lip of the bowl is 11. Bowls may be primarily circular, in a horizontal plane normal to the Figure. However, many other bowl shapes are in use and are suitable for use with embodiments. For such applications, the screen may not be circular, but may be elliptical, rectangular with rounded corners, or another shape that fits within the bowl interior. 19 shows an interior surface of the bowl. Ideally the perimeter of the screen 13 rests, with or without friction, against an interior portion of the bowl interior surface, 19. Such points or line of contact is shown 14. However, a precise fit is not necessary in all applications. Some space between the perimeter of the screen 13 and the inside surface of the bowl 19 is acceptable in many applications. 12 shows a volume inside the bowl 10, above the screen 13. See also FIG. 5. 17 shows an orifice. 20 shows the extent of the bowl and orifice in this Figure. However, for many pipes the orifice, or another fluid containing element, extends beyond the limit 20 shown in this Figure. Bowls may be solid, such that the region 10 in the figure is solid, typically with the same material throughout the bowl, such that the inside surface 19 comprises the same material as the body of the bowl 10. However, in many other bowl designs the walls of the bowl are hollow. For such a bowl the region 10 is not solid, but may contain air, a vacuum, or another material. One example of a bowl is made from glass, with hollow walls as described. The walls of the orifice may or may not be hollow, independent of the design of the bowl walls. Some embodiments include a pipe comprising a bowl 10; while other embodiments are free of a bowl, orifice, or pipe, in any combination.

Continuing with FIG. 1, we see key elements of embodiments, screen 13 and staple 16. In this embodiment, the screen 13 is shown as curved. In other embodiments it may be in the shape of a circular pyramid, in which case a cross section, such as this Figure, would show straight lines for screen 13, extending from the interior surface of the bowl 19 to the staple 16. In another embodiment the screen 13 may be fully, partially, or approximately planer. The screen shape when not installed in a bowl may be different than the shape when installed. In some embodiments, the screen is purposefully deformed as it is placed in a bowl. In one embodiment the screen is bent downward by pressure from insertion, or by pressure from a fingertip.

Continuing with FIG. 1, we see the staple 16 penetrating the screen 13 in two places, each with one of the two staple pins passing through a respective hole in the screen. Such holes are visible as 22 in FIG. 2. In other embodiments, such holes are not preformed in the screen 13, but rather are formed by the staple 16 when it penetrates the screen 13. Note that in the embodiment shown, the pins of the staple are tapered outward, so that the pin spacing at the tips of the pins 18 is wider that at the top of the staple 15. The top of the staple 15 is ideally curved, however other shapes are used in other embodiments, including flat, square or pointed.

Figure 3:
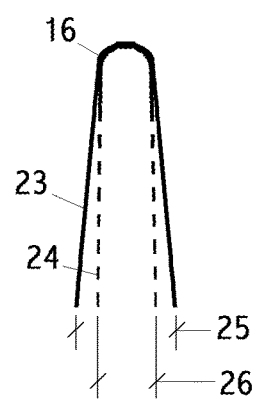
FIG. 3 shows an embodiment of a springy staple.

Continuing with FIG. 1 we an element key to embodiments which is a friction fit between the pin tips 18 and the inside of the orifice 17. Friction is created in some embodiments by springiness in the staple pins, such as shown in FIG. 3. However, not all embodiments use a springy staple.

Figure 2:
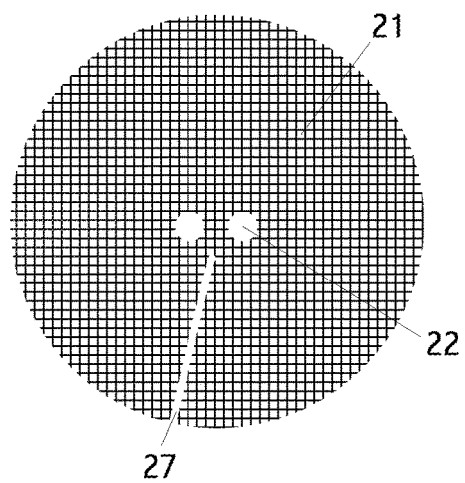
FIG. 2 shows an embodiment of a flat screen.

Turing now to FIG. 2, we see a top view of one embodiment of a screen 21. The screen 21 may be planer, curved, or in the form of a circular pyramid, as described elsewhere herein. Two holes are shown 22, through which the two pins of the staple pass, when an embodiment is assembled. Such holes 22 may not be preformed, but may be created by the placement of the staple through the screen 21. In some embodiments, holes are not explicit. For example, if a screen is glass wool, a staple may pass through without creating specific holes. The holes 22 are typically larger diameter that the width of the staple pin wires, to permit easy assembly. However, in some embodiments the holes are the same diameter. In some embodiments the holes are initially a smaller diameter, and then deformed as the staple is placed through the screen 21.

Continuing with FIG. 2, we see a radial slit, or cut, 27, in the screen 27. In this embodiment, the screen is a mesh, such as metal, such as stainless steal, spring steel, music wire, copper, brass; or glass or ceramic; or a plastic with a temperature, strength, and safety rating suitable for the application. This slit is helpful in some embodiments as it permits the edges of the screen at the slit 27 to overlap, reducing the effective diameter of screen to permit use in a range of bowl sizes, and also to create a circular pyramid shape, such as an inverted cone shape, that is useful to create a suitable volume in the bowl above the screen to hold material to be burned. A screen formed in such a way with overlapping edges in not shown.

Continuing with FIG. 2, the screen 21 may be stamped or otherwise a simply formed shape and portion from a larger, planer screen. However, some embodiments use a rim or lip around the perimeter of the screen, not shown. Such a perimeter rim avoids sharp edges from the screen. Such sharp edges may cause injury or break off. Some embodiments include a rim or lip around the perimeter of the holes 22. Such rims or lips may be created by forming the screen material, such as by rolling the edge. An alternative way to form a rim or lips is by the use of additional material.

Continuing with FIG. 2, the screen 21 may comprise a wool, such as a metal, glass or ceramic wool. This embodiment is not shown in the Figure. In such an embodiment, the wool may be compressed as the assembly is place into a bowl, rather than a slit in a mesh used to accommodate different size bowls.

Turning now to FIG. 3, we see a side view of a staple embodiment. The staple 16 is generally in the form of an inverted U. The top of the staple is shown as 15 in FIG. 1. The sides of the staple in its relaxed, or uninserted shape is shown as 23. The springy staple pins may be compressed towards each other, typically with fingers and without the use of tools, until they are parallel, or nearly parallel, as shown by the dotted lines 24. Such a shape is useful for inserting the staple through the screen, such as through the holes 22 shown in FIG. 2. Width 25 shows the spacing of the staple pin tips in the relaxed state. Width 26 shows the spacing of the staple pin tips when compressed for insertion through a screen. When the assembly of the screen and staple is placed into a pipe, the tips of the staple pins (18 in FIG. 1) are also compressed towards each other. They may be compressed to a spacing larger than 26, equal to spacing 26, or smaller than spacing 26. The compressed spacing depends on the inside diameter of the orifice (17 in FIG. 1) when the assembly is inserted into a pipe. The springiness of the staple permits a friction fit, or "purchase," against the inside of the orifice. In some embodiments, the staple is not springy, but is sized to fit in an orifice. For example, a tapered orifice may not require a springy staple. Also, if an orifice is springy or deformable, such as for plastic or metal corrugated pipe, or of a PVC material, a fiction or pressure fit may be obtained without springiness in the staple pins. In addition, in some applications a material such as a removable adhesive or sticky substance may be used to secure (temporarily or permanently) the staple pins inside the orifice.

Figure 4:
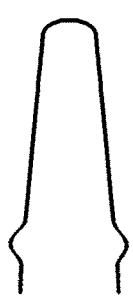
FIG. 4 shows an alternative staple shape.

FIG. 4 shows an alternative staple shape.

Figure 5:
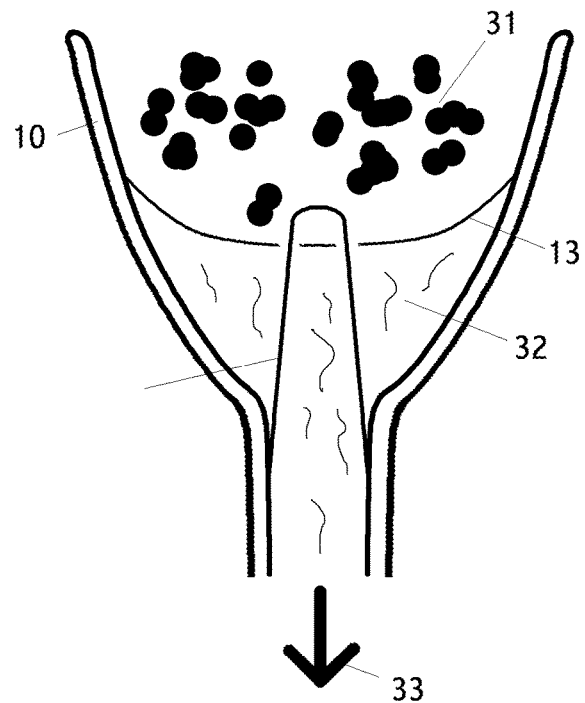
FIG. 5 shows an embodiment in use in a smoking pipe with burning material and a smoke stream.

Turning now to FIG. 5 we see one application and embodiment of the assembly in use. The assembly, such a shown also in FIG. 6, comprises a screen 13 and staple 16. The assembly is placed in a bowl 10. In this Figure, we see material burning 31, and smoke 32 from the burning material 31, through the screen 13 and then passing through the orifice shown as the large arrow path 33.

Figure 6:
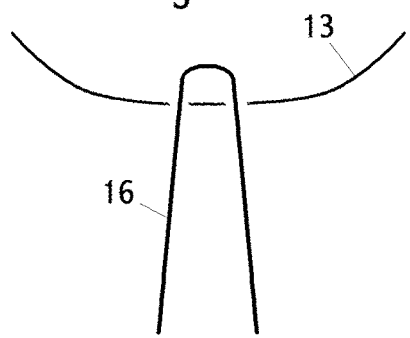
FIG. 6 shows an assembly embodiment.

Turning now to FIG. 6 we see a minimal embodiment of an assembly and also for a kit comprising two elements. Shown is screen 13 with penetrating staple 16. For some kit embodiments, the staple 16 is not pre-placed through the screen 13. In other kit embodiments, a bowl such as 10 in FIG. 5, is included in the kit. In some embodiments the screen 13 is a non-repeating matrix, such as glass or ceramic wool, or a wool from a metal.

Figure 7:
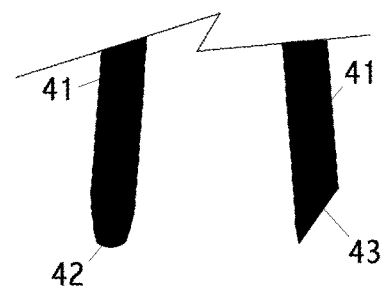
FIG. 7 shows a detail of staple pin tips.

Turning now to FIG. 7, we see two embodiments of the shape of the tips of the staple pins. 41 shows a non-scale view of an end portion of the two staple pins. 42 shows a rounded tip. 43 shows a cut tip. Other embodiments use different shapes, such as nail-style pointed tip, and a sharp point as in 43, but with the cut in a different orientation. Yet additional embodiments use a barbed tip or a tip with cut inward or formed outward rings. Typically, both pin tips have the same shape. Staple pins may be unequal lengths.

Figure 8:
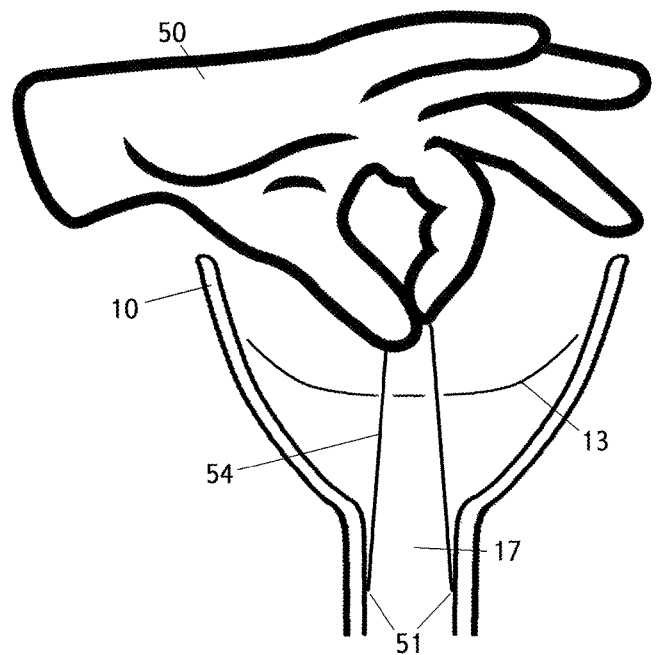
FIG. 8 shows a hand in an exemplary action of placing or removing a filter into a pipe bowl.

Turning now to FIG. 8, we see an adult human hand 50 in the process of inserting or removing a filter assembly, 13 and 54, into or out of a bowl 10, by grasping the top of the staple 54 with a thumb and forefinger. In FIG. 8, the staple 54 has its pins splayed out below the screen 13, so at to make a friction fit with the inside surface of the orifice 17, at two points 51.

Figure 9:
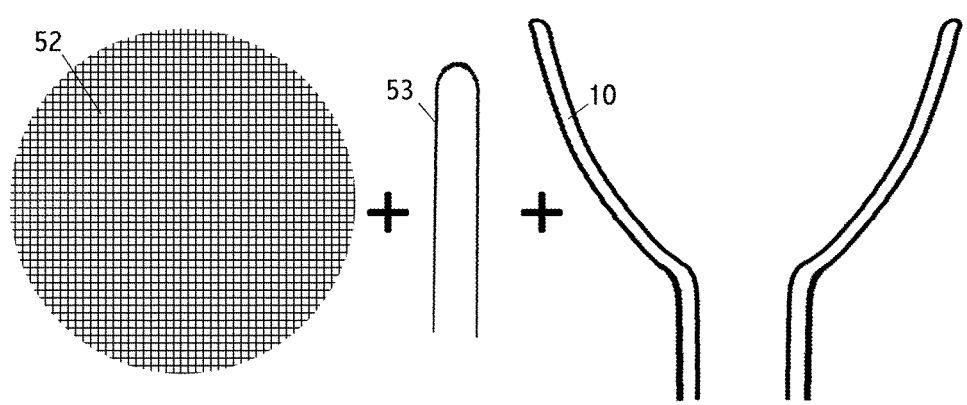
FIG. 9 shows an exemplary kit comprising a screen, staple and bowl.

Turning now to FIG. 9, we see one embodiment of a kit. The kit of FIG. 9 comprises three elements: a screen 52, a staple 53, and a pipe bowl 10 with a narrowing to form an orifice. As shown in this Figure, the screen 52 does not yet have any holes. Such holes, as shown 22 in FIG. 2, have not yet been made by a user of the kit. The staple 53 has parallel pins. A user of the kit may first press the staple pins through the screen 52, generally near the center of the screen. The pins puncture the screen creating two holes. The user then splays out the pins of the staple 53 to both hold it in place in the screen and also so that the spread pins may make a friction fit with the orifice. FIG. 8 shows such a punctured screen 13 and splayed pins 54, making a friction fit 51.

Other kits may have other embodiments, such as a plurality of staples and screens. Typically, after each use of the pipe, or after several uses, the filter assembly is pulled from the bowl of the pipe and replaced with a new filter assembly. Other kit embodiments do not include a bowl or pipe. Yet other embodiments include a portion of a pipe.

Some embodiments do not comprise pre-made holes. Holes may be effectively formed by insertion of the staple through the screen.

A suitable method of manufacturing an assembly is start with a staple with parallel pins. The staple is pressed through the screen, which may or may not have pre-made holes. The staple pins are then spread, for example by the use of a triangular of pointed anvil or die.

Suitable materials include stainless steel, ideally food or medical grade. Other materials include copper, brass, spring steel, and plated or coated metals. Other materials include ceramic and glass. For applications that do not involve burning material, lower temperature materials such as plastic, such as ABS or polyamide, or rubber, may be used.

Applications other than smoking pipes include drain lines, drainpipes, mining, and chemical processing.

A suitable mesh for the screen is 40×30, 0.625 inch diameter circle, material 304 stainless steel. Suitable spacing for the two holes in the screen is 0.13 inch, 0.26 inch diameter. Suitable gauges for the staple are 16-22 gauge, 304 stainless steel. A suitable length of the staple is 0.65 inches. A suitable spacing of the staple pins proximal to central bend is 0.13 inches. A suitable spacing of staple pin tips is in the range 0.15 to 0.60 inch, when the staple is relaxed.

A suitable staple model is: Duo-Fast Staples 6420 CR: 3/16 inch crown×5/8 inch leg, 19 gauge, available from Duo-Fast Corporation, 955 National Pkwy #95500, Schaumburg, Ill. 60173. Another suitable staple model is: Porter Cable NS18075 1/4 inch crown, 3/4 length, 18 gauge, available from Porter-Cable, Jackson, Tenn.; the company is a subsidiary of Stanley Black & Decker. Screens may be purchased from wireclosthmesh.com.

Table 1 below shows various embodiments and options for screens.

TABLE I

| Mesh/Inch | Wire Gauge (SWG) | Aperture in mm |
|---|---|---|
| 3 mesh × 3 mesh | 14 | 6.27 |
| 4 mesh × 4 mesh | 16 | 4.27 |
| 5 mesh × 5 mesh | 18 | 3.86 |
| 6 mesh × 6 mesh | 18 | 3.04 |
| 8 mesh × 8 mesh | 20 | 2.26 |
| 10 mesh × 10 mesh | 20 | 1.63 |
| 20 mesh × 20 mesh | 30 | 0.95 |
| 30 mesh × 30 mesh | 34 | 0.61 |
| 40 mesh × 40 mesh | 36 | 0.44 |
| 50 mesh × 50 mesh | 38 | 0.36 |
| 60 mesh × 60 mesh | 40 | 0.3 |
| 80 mesh × 80 mesh | 42 | 0.21 |
| 100 mesh × 100 mesh | 44 | 0.172 |
| 120 mesh × 120 mesh | 44 | 0.13 |
| 150 mesh × 150 mesh | 46 | 0.108 |
| 160 mesh × 160 mesh | 46 | 0.097 |
| 180 mesh × 180 mesh | 47 | 0.09 |
| 200 mesh × 200 mesh | 47 | 0.077 |
| 250 mesh × 250 mesh | 48 | 0.061 |
| 280 mesh × 280 mesh | 49 | 0.06 |
| 300 mesh × 300 mesh | 49 | 0.054 |
| 350 mesh × 350 mesh | 49 | 0.042 |
| 400 mesh × 400 mesh | 50 | 0.0385 |

OTHER EMBODIMENTS

101. A filter assembly comprising:
    a screen;
    a staple in the form of a U comprising two pins and a central bend;
    wherein each of the two pins of the staple penetrates the screen through two respective holes, wherein the holes are separated by a first distance;
    wherein each of the two pins comprises a pin tip;
    wherein each of the two pins comprises a penetration region between the pin tips and the central bend;
    wherein a first spacing of the pin tips is a second distance, larger than the first distance;
    wherein the two pins of the staple may be temporarily compressed together such that the first spacing at the tips narrows such that the two pin tips may pass through the two screen holes.
102. The filter assembly of embodiment 101 wherein:
    a third distance between the screen and the central bend of the staple is appropriate for an average adult human to grasp the staple in the region between the screen and the central bend using the average adult human's thumb and forefinger of one hand.
103. The filter assembly of embodiment 101 further comprising:
    a radial slit in the screen from a point on the perimeter of the screen extending inward towards the center of the screen.
104. The filter assembly of embodiment 101 wherein:
    a plane of the screen, at the two holes, passes through the penetration region of each pin.
105. The filter assembly of embodiment 101 further comprising:
    a rim on a perimeter of the screen.
106. The filter assembly of embodiment 101 wherein:
    the screen and the staple are adapted to be placed into a bowl and an orifice, wherein an inside diameter of the orifice is less than an inside diameter of the bowl;
    wherein the inside of the bowl and the inside of the orifice are fluidly connected; and
    wherein the inside diameter of the orifice is less than the second distance.

107. The filter assembly of embodiment 106 wherein:
the bowl is a bowl of a smoking pipe; wherein an internal path from the bowl to a mouthpiece of the smoking pipe comprises the orifice.
108. The filter assembly of embodiment 106 wherein:
the shape of the screen, when inserted into the bowl, is an inverted cone.
109. The filter assembly of embodiment 106 wherein:
the shape of the screen, when inserted into the bowl, is curved downward.
110. The filter assembly of embodiment 106 wherein:
the screen is adapted to be bent downward by a finger of an average adult as the screen is placed into the bowl.
111. The filter assembly of embodiment 106 wherein:
the staple is adapted to hold the filter assembly in the bowl solely by friction of the pin tips against the inside of the orifice.
112. The filter assembly of embodiment 106 wherein:
the filter assembly is adapted to be positioned in the bowl such that a charge of burnable material is in the bowl and above the screen;
wherein openings in the screen are sufficiently small that solid elements the charge are blocked from passing through the filter;
wherein openings in the screen are sufficiently large that smoke from a burning charge passes through the screen.
113. The filter assembly of embodiment 101 wherein:
the screen comprises a mesh.
114. The filter assembly of embodiment 101 wherein:
the screen comprises a wool.
115. The filter assembly of embodiment 101 wherein:
the dimensions of the screen are suitable for use in a water drainpipe.
116. A method of smoking comprising the steps:
placing, by hand, the assembly of embodiment 1 into a smoking pipe bowl;
placing a smokable material in the smoking pipe bowl, above the screen;
lighting the smokable material;
drawing smoke from the smokable material through the screen.
117. The method of smoking of embodiment 116 comprising the further steps:
extinguishing the smokable material;
grasping the central bend of the staple using a thumb and forefinger;
removing the assembly by pulling the central bend of the staple.
118. A filter kit comprising:
a screen;
a staple in the form of a U comprising two parallel pins spaced a first distance, connected at one end by a central curve;
wherein the two pins are adapted to puncture the screen, creating two holes in the screen, spaced at the first distance, through which the pins pass, when the staple is pushed with adult human fingers into the screen;
wherein a portion of the pins of the staple that have passed through the screen are adapted to be splayed apart by adult human fingers such that the ends of the two pins are then separated by a second distance, larger than the first distance.
119. The filter kit of embodiment 118, further comprising:
a smoking pipe bowl and orifice, wherein an inside of the bowl and an inside of the orifice are fluidly connected, and
wherein an inside diameter of the orifice is smaller than an inside diameter of the bowl; and
wherein the second distance is larger than the inside diameter of the orifice;
wherein the screen is adapted to be held in place inside the bowl, when inserted by adult human fingers, entirely by friction between the ends of the pins and an inside surface of the orifice, and
wherein, when the screen is so placed inside the bowl, the screen and smoking pipe bowl are adapted so that a smokable charge fits inside the bowl, above the screen; and
wherein the screen is adapted to block solid particles from the smokable charge from passing through the screen while permitting smoke from a burning charge to pass through the screen into the orifice; and
wherein the screen, staple, bowl and orifice are adapted so that the screen and staple may be removed from the bowl by grasping and pulling with an adult human thumb and forefinger a portion of the staple above the screen.
120. (not used)
121. An embodiment for a kit, wherein the bowl and orifice are free of an interior lip for the purpose of supporting, holding or securing a filter or filter screen.
122. An embodiment for a kit, further comprising a plurality of screens, staples or both.
123. A method of assembling a filter assembly from a kit wherein the screen is free of staple holes until a staple has been pushed through the screen.
124. A kit, wherein a screen in the kit is free of staple holes.
125. A filter assembly, or a kit for a filter assembly, wherein the pins of the staple are initially parallel to each other.
126. A method of assembling a kit for a filter comprising a step of pushing a staple through a screen.
127. Any other embodiment, wherein the embodiment is free of an element, to secure all or part of a filter assembly to a bowl, that extends over a lip of the bowl.
128. Any other embodiment wherein the filter assembly is free of a tether.
129. A method, using any other embodiment, of installing a filter in a bowl, comprising (a) pushing a staple through a screen; (b) expanding the width of the staple pins below the screen; (c) inserting the screen with the penetrating staple into a bowl.
130. Any other embodiment, such as 102, such that when a portion of the staple above the screen is grasped by an adult human's thumb and forefinger, the adult human may remove the filter assembly clear of the bowl, with a single pulling motion.
131. Any other embodiment wherein the screen is comprised of brass or stainless steel.
132. Any other embodiment wherein the pins of the staple comprise spring steel.
133. Any other embodiment wherein both the bowl and orifice are an entry portion of drain pipe, such as for water. Note that the drainpipe may be vertical, horizontal, or at another angle. The size of openings in the screen may be sized appropriate to the filtering action desired, such as keeping leaves, branches, trash, rocks, animals, people, or other detritus from entering the narrower portion of the pipe, which functions as the orifice in this embodiment.
134. Any other embodiment wherein both the bowl and orifice are an entry portion of pipe adapted for use to transport an industrial fluid. Such a pipe may not be an entry point. For example, the filter may be at a point where a pipe narrows. In this embodiment, the wider portion of the pipe is effectively the bowl and the narrower portion is effectively the orifice. The size of openings in the screen may be sized appropriate to the filtering action desired. The fluid may be a gas, liquid, slurry, or other fluid.

135. Any other embodiment wherein the charge is, or may be, marijuana, hash, or a cannabis containing plant matter.
136. Any other embodiment, where the bowl and orifice are either "connected," or "connectable." For example, a bowl and orifice may be, prior to use, separate elements.
137. Any other embodiment wherein the filter assembly is held in place by a combination of friction between the pins and the interior of the orifice and by friction between the perimeter of the screen and the interior of the bowl, but with no other mechanism for holding the filter assembly in place.
138. Any other embodiment wherein the bowl is adapted to burn marijuana or another cannabis containing plant matter.
139. Any other embodiment comprising a kit comprising marijuana or another cannabis containing plant matter.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the embodiments.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only.

Embodiments of this invention explicitly include all combinations and sub-combinations of all features, elements and limitation of all embodiments. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the embodiments, specification and drawings. Embodiments of the methods of invention explicitly include all combinations of dependent method embodiment steps, in any functional order. Embodiments of the methods of invention explicitly include, when referencing any device embodiment, a substitution thereof to any and all other device embodiments, including all combinations of elements in device embodiments.

I claim:

1. A filter assembly comprising:
a screen;
a staple in the form of a letter shape U comprising two pins and a central bend;
wherein each of the two pins of the staple penetrates the screen through two respective holes, wherein the holes are separated by a first distance;
wherein each of the two pins comprises a pin tip;
wherein each of the two pins comprises a penetration region between the pin tips and the central bend;
wherein a first spacing of the pin tips is a second distance, larger than the first distance;
wherein the two pins of the staple may be temporarily compressed together such that the first spacing at the tips narrows such that the two pin tips may pass through the two screen holes;
wherein a third distance between the screen and the central bend of the staple is appropriate for an average adult human to grasp the staple in the region between the screen and the central bend using the average adult human's thumb and forefinger of one hand.

2. The filter assembly of claim 1 further comprising:
a radial slit in the screen from a point on the perimeter of the screen extending inward towards the center of the screen.

3. The filter assembly of claim 1 wherein:
a plane of the screen, at the two holes, passes through the penetration region of each pin.

4. The filter assembly of claim 1 further comprising:
a rim on a perimeter of the screen.

5. The filter assembly of claim 1 wherein:
the screen comprises a mesh.

6. The filter assembly of claim 1 wherein:
the screen comprises a wool.

7. The filter assembly of claim 1 wherein:
the dimensions of the screen are suitable for use in a water drainpipe.

8. A method of smoking comprising the steps:
placing, by hand, the assembly of claim 1 into a smoking pipe bowl;
placing a smokable material in the smoking pipe bowl, above the screen;
lighting the smokable material; and
drawing smoke from the smokable material through the screen.

9. The method of smoking of claim 8 comprising the further steps:
extinguishing the smokable material;
grasping the central bend of the staple using a thumb and forefinger;
removing the assembly by pulling the central bend of the staple.

10. The filter assembly of claim 1 wherein:
the screen and the staple are adapted to be placed into a bowl and an orifice, wherein an inside diameter of the orifice is less than an inside diameter of the bowl;
wherein the inside of the bowl and the inside of the orifice are fluidly connected; and
wherein the inside diameter of the orifice is less than the second distance.

11. The filter assembly of claim 10 wherein:
the bowl is a bowl of a smoking pipe; wherein an internal path from the bowl to a mouthpiece of the smoking pipe comprises the orifice.

12. The filter assembly of claim 10 wherein:
a shape of the screen, when inserted into the bowl, is an inverted cone.

13. The filter assembly of claim 10 wherein:
a shape of the screen, when inserted into the bowl, is curved downward.

14. The filter assembly of claim 10 wherein:
the screen is adapted to be bent downward by a finger of an average adult human as the screen is placed into the bowl.

15. The filter assembly of claim 10 wherein:
the staple is adapted to hold the filter assembly in the bowl solely by friction of the pin tips against the inside of the orifice.

16. The filter assembly of claim 10 wherein:
the filter assembly is adapted to be positioned in the bowl such that a charge of burnable material is in the bowl and above the screen;
wherein openings in the screen are sufficiently small that solid elements the charge are blocked from passing through the filter; and
wherein openings in the screen are sufficiently large that smoke from a burning charge passes through the screen.

17. A filter kit comprising:
a screen;
a staple in the form of a letter shape U comprising two parallel pins spaced a first distance, connected at one end by a central curve;
wherein the two pins are adapted to puncture the screen, creating two holes in the screen, spaced at the first distance, through which the pins pass, when the staple is pushed with average adult human fingers into the screen;
wherein a portion of the pins of the staple that have passed through the screen are adapted to be splayed apart by average adult human fingers such that the ends of the two pins are then separated by a second distance, larger than the first distance;
wherein the screen is adapted to be placed into a smoking pipe bowl with an orifice, wherein an inside of the bowl and an inside of the orifice are fluidly connected; and
wherein an inside diameter of the orifice is smaller than an inside diameter of the bowl;
wherein the screen is adapted to block solid particles from the smokable charge from passing through the screen while permitting smoke from a burning charge to pass through the screen into the orifice; and
wherein the screen, staple, bowl and orifice are adapted so that the screen and staple may be removed from the bowl by grasping and pulling with an average adult human thumb and forefinger a portion of the staple above the screen.

18. The filter kit of claim 17, further comprising:
a smoking pipe bowl and orifice, wherein an inside of the bowl and an inside of the orifice are fluidly connected; and
wherein an inside diameter of the orifice is smaller than an inside diameter of the bowl; and
wherein the second distance is larger than the inside diameter of the orifice;
wherein the screen is adapted to be held in place inside the bowl, when inserted by average adult human fingers, entirely by friction between the ends of the pins and an inside surface of the orifice; and
wherein, when the screen is so placed inside the bowl, the screen and smoking pipe bowl are adapted so that a smokable charge fits inside the bowl, above the screen; and
wherein the screen is adapted to block solid particles from the smokable charge from passing through the screen while permitting smoke from a burning charge to pass through the screen into the orifice; and
wherein the screen, staple, bowl and orifice are adapted so that the screen and staple may be removed from the bowl by grasping and pulling with an average adult human thumb and forefinger a portion of the staple above the screen.

\* \* \* \* \*